United States Patent
Simnacher

Patent Number: 5,303,969
Date of Patent: Apr. 19, 1994

[54] STORAGE DEVICE FOR A PICKUP TRUCK

[76] Inventor: Larry W. Simnacher, 1912 Sandlewood, Bay City, Tex. 77404-2217

[21] Appl. No.: 59,306

[22] Filed: May 11, 1993

[51] Int. Cl.⁵ .............................................. B60R 11/06
[52] U.S. Cl. ................................. 296/37.6; 224/42.42
[58] Field of Search ........................... 296/37.6, 37.1; 224/42.42

[56] References Cited
U.S. PATENT DOCUMENTS

| | | | |
|---|---|---|---|
| 3,326,595 | 6/1967 | Ogilvie | 296/37 |
| 3,664,704 | 5/1972 | Ellis | 296/24 R |
| 4,088,365 | 5/1978 | Johnson | 296/37.6 |
| 4,469,364 | 9/1984 | Rafi-Zadeh | 296/37.6 |
| 4,705,317 | 11/1987 | Henri | 296/37.6 |
| 4,789,195 | 12/1988 | Fletcher | 296/37.6 |
| 4,830,242 | 5/1989 | Painter | 224/42.32 |
| 4,844,305 | 7/1989 | McKneely | 224/42.42 |
| 4,936,624 | 6/1990 | West | 296/37.6 |
| 5,201,561 | 4/1993 | Brown | 296/37.6 |

FOREIGN PATENT DOCUMENTS 2623759 11/1987 France .......................... B60P 3/029

Primary Examiner—Robert R. Song
Attorney, Agent, or Firm—Harrison & Egbert

[57] ABSTRACT

A storage device for a bed of a pickup truck having a body with a storage area therein and a door affixed thereto. The door allows access to the storage area. A fluid-activated lifting mechanism is attached to the body at opposite ends of the body. The lifting mechanism serves to move the body from a first position in juxtaposition to the bed of the truck and a second position above the side wall of the truck. The door is positioned above the side wall in the second position. The body has an identation formed therein for extending over the wheel well of the truck. The body is positioned adjacent the side wall of the pickup truck such that the door is interposed between the body and the side wall in the first position. The lift mechanism includes a first hydraulic cylinder affixed to a first end of the body and a second hydraulic cylinder affixed to a second end of the body. A hydraulic actuator is connected to the first and second hydraulic cylinders so as to move the body between the first and second positions.

20 Claims, 2 Drawing Sheets

STORAGE DEVICE FOR A PICKUP TRUCK

TECHNICAL FIELD

The present invention relates to storage devices, in general. More particularly, the present invention relates to storage devices that can be utilized in the bed of a pickup truck. Additionally, the present invention relates to storage devices that can be hydraulically maneuvered from a stowed position to a usable position.

BACKGROUND ART

Pickup trucks and vehicles having open cargo compartments are used extensively for transporting purposes. Apparatus have been developed to organize the cargo space and to minimize the motion of transported articles located therein during periods of transit. Such transported articles often need to be protected from inclement weather so covering the cargo compartment becomes important. When many different articles are being transported at the same time, segregating the articles is also an important consideration.

During certain types of transport, it is desirable to include a storage container in the rear of a pickup truck. The storage compartment serves to retain tools, and other items, so as to allow the user of the pickup truck to have access to such tools at the desired destination. Unfortunately, conventional tool boxes, in the back of pickup trucks, are often positioned in an extremely poor location. For example, some tool boxes are located in the bed of the of the pickup truck such that the operator is required to bend over the side wall of the vehicle in order to reach into the tool box and lift the tool from the tool box. Back strain can often occur from efforts to lift tools from the bed of the pickup truck. It is often difficult to look over the side wall of the pickup truck so as to inspect the variety of tools which reside in the tool box. Many tool boxes have been provided which successfully contain tools, but also reduce the amount of space in the cargo area of the pickup truck. Normally, the tool boxes of such pickup trucks must be locked so as to prevent theft. As a result, when the vehicle reaches the destination, a great deal of effort is taken so as to unlock the various tool boxes on the back of the pickup truck.

It has often been found that the wheel well of the pickup truck minimizes the amount of space that can be available for the receipt of tool boxes. Tool boxes have not been designed so as to accommodate the intruding presence of the wheel well.

Various patents have issued in the past which have described various types of tool boxes, organizers, and compartments for use on the back of pickup trucks.

U.S. Pat. No. 4,936,624, issued on Jun. 26, 1990, describes a tool box assembly for installation in pickup trucks. A pair of tool boxes are pivotally mounted in an enclosed frame for movement between an access position and a secured position. The movement of the tool boxes is driven by a hydraulic system. In the access position, the tool boxes are supported in an open position above the side wall of the truck. In the secured position, the tool boxes are enclosed completely by the frame which does not extend above the side walls of the truck. As the boxes are raised, the lids are automatically opened. When the boxes are lowered, the lids are closed and locked in a closed position.

U.S. Pat. No. 4,088,365, issued on May 9, 1978, to D. J. Johnson, describes a portable storage apparatus which is provided in conjunction with foldable camping trailers. This apparatus is suitable for mounting at an eye level or at an overhead position between a countertop and the ceiling of a trailer. Essentially, the extended frame is provided to as to raise and lower the storage apparatus in a mechanical fashion.

U.S Pat. No. 4,789,195, issued on Dec. 6, 1988, to N. R. Fletcher, U.S. Pat. No. 4,830,242, issued on May 16, 1989, to C. N. Painter, and U.S. Pat. No. 4,844,305, issued on Jul. 4, 1989, to J. W. McKneely teach movable tool boxes for trucks. Each of these tool boxes are placed in a stationary position in the interior of the bed of the pickup truck. These tool boxes are arranged so as to be contained in a position that allows access above the side of the truck. In general, these devices are simply boxes which are configured to fit on the interior of the pickup truck.

French Patent No. 2,623,759, issued to M. Arriaza, teaches a hydraulically powered display unit that is presented in a vertical position at the side of the vehicle. A hydraulic piston-and-cylinder arrangement is provided on the floor of the vehicle and is fastened to a side of the display. Upon activation, the display will raise from the floor of the vehicle into an upright position along a side of the vehicle.

It is an object of the present invention to provide a tool box that can move vertically in the bed of a pickup truck.

It is another object of the present invention to provide a tool box that conveniently fits over the wheel well of the bed of the pickup truck.

It is another object of the present invention to provide a tool box that is generally theft proof in its lower position.

It is still another object of the present invention to provide a tool box for pickup trucks that can be remotely operated from the interior of the pickup truck or at a location exterior of the pickup truck.

It is still a further object of the present invention to provide a tool box that can be raised to an eye level position along the side wall of a pickup truck.

It is still another object of the present invention to provide a tool box assembly which prevents rocks, and other items from the bed of the pickup truck, from residing beneath the tool box.

It is still a further object of the present invention to provide a tool box that is easy to manipulate, easy to use, convenient, and relatively inexpensive.

These and other objects and advantages of the present invention will become apparent from a reading of the attached specification and appended claims.

SUMMARY OF THE INVENTION

The present invention is a storage device for the bed of a pickup truck comprising a body with a storage area therein and a door affixed thereto and a fluid-activated lift means attached to the body at opposite ends of the body. The door allows access to the storage area of the body. The lift means serves to move the body from a first position in juxtaposition to the bed of the truck and a second position above the side wall of the truck. The door is positioned above the side wall in the second position.

The body has an indentation formed therein having a size greater than the wheel well of a truck. The shape of the indentation allows the body to fit over the wheel well of the pickup truck. The body has a generally flat bottom surface extending downwardly from the indentation. This bottom surface is in surface-to-surface contact with the bed of the pickup truck when the body is in its first position. The body is positioned adjacent to the side wall of the pickup truck such that the door is interposed between the body and the side wall in the first position. The door is hingedly connected to a top surface of the body and extends downwardly from the hinged connection. The body has rollers interposed between the body and the side wall.

The lift means of the present invention includes a first hydraulic piston-and-cylinder affixed to a first end of the body and to the bed of the truck, a second hydraulic piston-and-cylinder affixed to a second end of the body and to the bed of the truck, and an actuator hydraulically connected to the first and second piston-and-cylinders. This actuator serves to move the body between the first and second positions. The actuator is affixed to a frame of the truck below the bed of the truck. The actuator has at least one hose extending to the piston-and-cylinders. A remote controller is provided which is electrically connected to the actuator. The remote controller causes the desired amount of movement of the body between the first and second positions. The remote controller has an electrical line of greater than six feet. This remote controller is demountably received within the cab of the truck so as to allow the remote controller to be removable to the exterior of the truck.

A channel member is formed in the bed of the truck adjacent to a side of the body opposite the side wall. This channel extends upwardly from the bed so as to form a receiving area for the body in the first position.

DETAILED DESCRIPTION OF THE INVENTION

Figure 1:
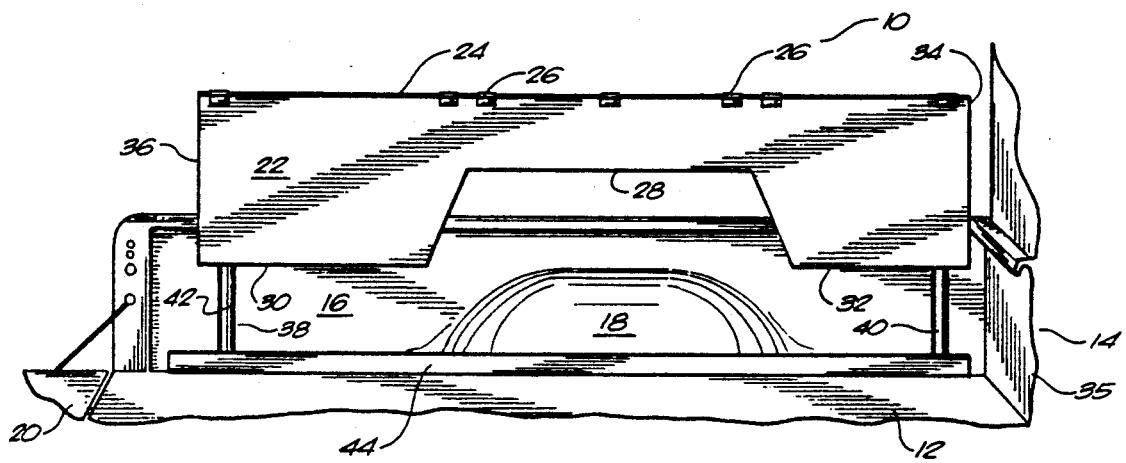
FIG. 1 is a side elevational view of the storage device of the present invention as viewed from the bed of the pickup truck.

Referring to FIG. 1, there is shown at 10 the storage device in accordance with the preferred embodiment of the present invention. The storage device 10, as illustrated in FIG. 1, is shown from a view on the interior of the bed 12 of pickup truck 14. The pickup truck 14 is of a type having a bed 12 located in the rear of the pickup truck 14. A side wall 16 extends upwardly from the bed 12. A wheel well 18 is formed in side wall 16. The wheel well 18 is configured so as to allow sufficient room for the rotation and movement of the wheel of the pickup truck. The bed 12 includes a tailgate 20 hingedly connected to the rear of the bed 12.

The storage device 10 includes a body 22 which has a storage area therein. A door 24 is connected by hinges 26 to the top surface of the body 22. The door 24 allows access to the interior of the storage area. The body 22 has an indentation 28 formed therein. As can be seen, the indentation 28 has a size greater than the size of the wheel well 18. Ideally, the indentation 28 will fit over the exterior of the wheel well 18 so as to maximize the storage area within the storage device 10. The body 22 includes a first flat bottom surface 30 and a second flat bottom surface 32 extending downwardly from the indentation 28. The flat surfaces 30 and 32 are suitable for surface-to-surface contact with the bed 12 of the pickup truck 14.

As can be seen, the storage device 10 has a length generally corresponding to the length of the bed 12 of the pickup truck 14. The top surface of the body 22 is linear and generally extends in parallel relation to the flat bottom surfaces 30 and 32. One end 34 is adjacent to the forward surface 35 of the bed 12 of pickup truck 14. The other end 36 is adjacent to the tailgate 20.

Importantly, the storage device 10 includes a lift mechanism 38. The lift mechanism 38 is attached to the body 22 at ends 34 and 36. The lift mechanism 38 serves to move the body 22 from a first position in juxtaposition to the bed 12 of the pickup truck 14 and a second position, as illustrated in FIG. 1, above the side wall 16 of the pickup truck 14. The door 24 is positioned above the side wall 16 in its second position.

As can be seen, the mechanism 38 includes a first piston-and-cylinder 40 which is attached to the end 34 adjacent to the forward surface 35 of the bed 12. A second piston-and-cylinder 42 is affixed to the end 36 of the body 22. The first piston-and-cylinder 40 is also affixed to the bed 12. Similarly, the second piston-and-cylinder 42 is affixed to the bed 12. In this manner, the piston-and-cylinders 40 and 42 provide support for the body 22 in its second position above the side wall 16. The term "piston-and-cylinder" is used since it is conceivable that the cylinder can be supported on the bed 12 while the piston is used to raise and lower the body 22. Alternatively, the piston of the piston-and-cylinder can be affixed to the bed 12 while the cylinder is used to raise and lower the body 22.

A channel member 44 is formed, or fastened, to the bed 12 adjacent to the side of the body 22 opposite the side wall 16. As can be seen, the channel member 44 extends upwardly from the bed 12 so as to form a receiving area for the body 22 in its first position. The channel member 44 extends longitudinally along the bed 12 from the surface 35 to the tailgate 20. The channel member 44 is configured so as to prevent rocks, bottles, debris, and other objects, from rolling underneath the slant surfaces 30 and 32 of the body 22. The presence of such objects under these surfaces 30 and 32 would tend to prevent the body 22 from properly being lowered into its first position.

Figure 2:
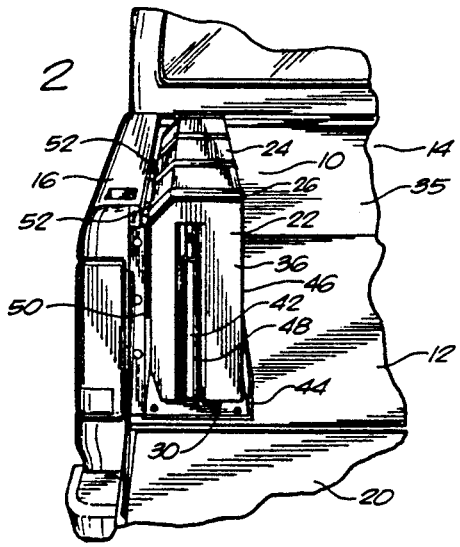
FIG. 2 is an end view of the storage device of the present invention.

FIG. 2 shows an end view of the storage device 10. The storage device 10 extends upwardly vertically from the bed 12 of the pickup truck 14. The body 22 has a side wall 46 extending upwardly vertically and in juxtaposition against a surface of the channel member 44. The side 46 serves as the back surface of the storage device 10. The side 46 also serves as an area for the retaining of objects on the bed 12 of the pickup truck 14. In essence, the side 46 serves the same function as the side wall 16 without the obstruction of the wheel well 18. The end 36 includes an inset area 48 which receives the piston-and-cylinder 42. The opposite end 34 of the body 22 will also include an inset area for the receipt of the piston-and-cylinder 40. Since the piston-and-cylinder 42 is received within the inset area 48, the piston-and-cylinder 42 is retained in a safe configuration. Importantly, it can be seen that the door 24 is hingedly connected at 26 to the top surface of the body 22. Specifically, the hinges 26 are connected to the top of the side 46. The door 24 forms the top surface of the body 22 and extends downwardly therefrom. As can be seen, the bottom edge 50 of the door 24 is interposed between the side wall 16 and the body 22. This is an important aspect of the present invention. When the storage device 10 is in its lowered position against the bed 12 of the pickup truck 14, the bottom edge 50 of the door 24 is interposed against the side wall 16 and the body 22. In the lowered position, it is impossible to open the door 24. As a result, it is not necessary to use locking devices for the purpose of securing the storage device 10. It is only necessary that the body 22 be lowered so that the bottom 30 is in juxtaposition to the bed 12. Since the door 24 is received in this manner, it is impossible to grip the bottom edge 50 for the purpose of rotating the door 24 about its hinges 26.

The body 22 includes rollers 52 that are interposed between the side wall 16 and the door 24. The rollers 52 can be rotatably mounted to the side wall 16 of the pickup truck 14 or they can be mounted to the exterior surface of the door 24. The rollers 52 serve to facilitate the ability to move the body 22 from its lowermost position to its uppermost position. The rollers 52 further serve to prevent abrasive contact between the body 22 and the interior surfaces of the side wall 16.

Figure 3:
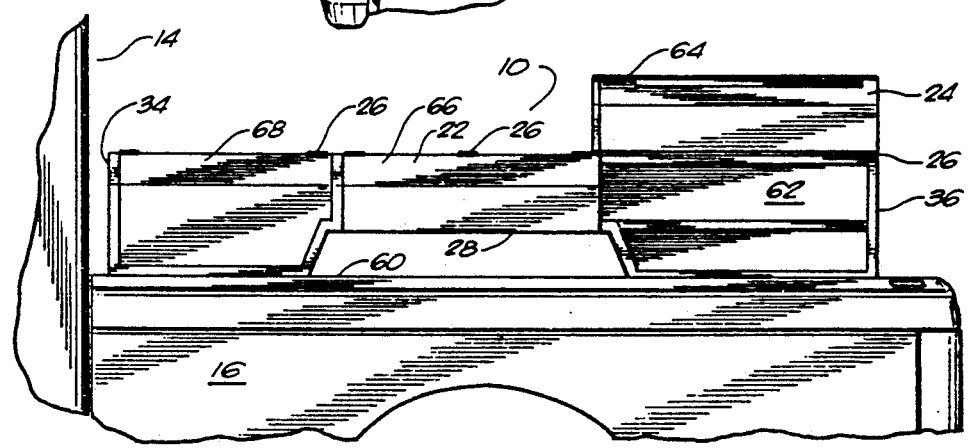
FIG. 3 is a side elevational view of the storage device of the present invention viewed from the exterior of the pickup truck.

In the lowered position, as illustrated in FIG. 2, the indentation 28 is fitted over the exterior surface of the wheel well 18. The storage device 10 maximizes the available area for the storage of tools by fitting over the wheel well 18. FIG. 3 illustrates the body 22 in its second, or uppermost, position. As can be seen, the body 22 is raised above the top 60 of the side wall 16 of the pickup truck 14. In the position illustrated in FIG. 3, the storage device 10 is in a suitable position for access to tools, and other items, contained therein. As can be seen, the storage device 10 has a body 22 with a storage area 62 contained therein. Door 24 is hingedly connected at 26 to the body 22. The door 24 is illustrated as opened for the purpose of allowing access to tools therein. The door 24 will rotate about its hinges 26 so as to allow the user to properly gain access to the storage area 62.

In FIG. 3, the storage device 10 is illustrated as having a first door 64, a second door 66, and a third door 68. The first door 64 is illustrated in its open position, as described herein previously. The second door 66 is positioned over the indentation 28 and will be positioned above the wheel well 18 of the pickup truck 14. The third door 68 is positioned adjacent to the end 34 adjacent to the back 36 of the pickup truck 14. The storage device 10 of the present invention thereby allows three compartments to exist for the storage of tools. Since the bottom edges of each of the doors 64, 66, and 68 will reside below the top 60 of side wall 16 in the first, or lowered position, the storage device 10 will be properly secured without the need for locks.

Figure 4:
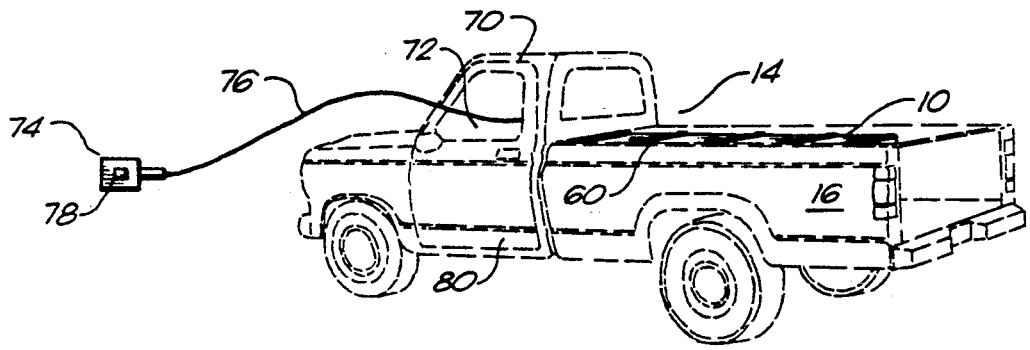
FIG. 4 is a perspective view of a pickup truck with the storage device in its lowered position having a remote controller extending outwardly of the cab of the pickup truck.

FIG. 4 is a perspective view of pickup truck 14 with the storage device 10 in its lowered position. As can be seen, the top of the storage device 10 resides generally flush with the top 60 of the side wall 16. As such, the storage device 10 will present little or no wind resistance during normal travel in the pickup truck 14. The lowered position of the storage device 10 will not be obvious to passersby. Since the storage device 10 resides generally flush with the top 60, the storage device 10 will be very inconspicuous. The inconspicuous nature of the storage device 10 will further deter theft.

In FIG. 4, it can be seen that the pickup truck 14 includes a cab 70 placed forward of the storage device 10. The cab 70 has a window 72 as shown in a partially opened position. Importantly, the storage device 10, of the present invention, includes a remote controller 74 having an electrical line 76 extending into the cab 70. The remote controller 74 has an appropriate configuration so as to allow the remote manipulation of the storage device 10 between its first and second positions. The remote controller 74 has a button 78 thereon. The button 78 can be pressed so as to properly actuate the piston-and-cylinders for the raising and lowering of the storage device 10. The electrical line 76 has a length of at least six feet so as to allow the remote controller 74 to be properly positioned on the interior of the cab 70 or to be extended outwardly from the cab 70. Often, the user will find it convenient to use the remote controller 74 on the exterior of the pickup truck 14. Alternatively, the user may desire to utilize the remote controller 74 on the interior of cab 70. As such, the availability of the remote controller 74, and its extended electrical line 76, adds a great deal of flexibility to the use of the present invention. The line 76 can be extended outwardly of window 72 or can be extended through the opened door 80.

Figure 5:
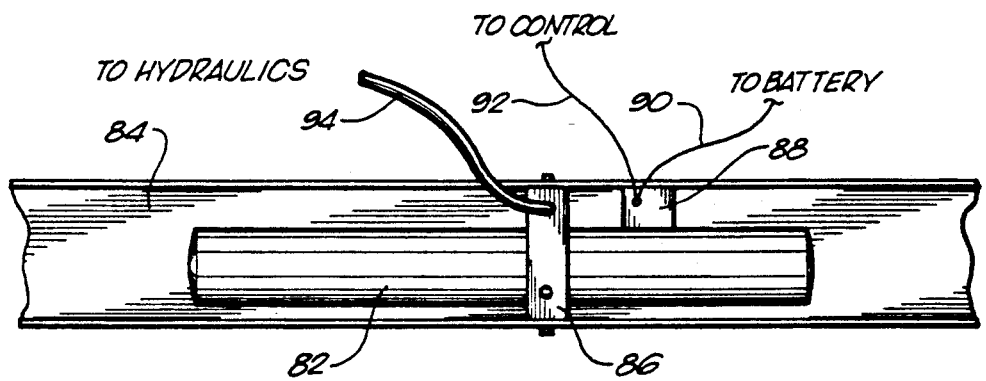
FIG. 5 is an illustration of the hydraulic controller for the storage device of the present invention.

FIG. 5 shows the actuator 82 of the present invention. The actuator 82 is a hydraulic actuator that is affixed to the frame 84 on the underside of the bed 12 of the pickup truck 14. Frame member 84 extends along the underside of the bed 12. The hydraulic actuator 82 is fastened by a retaining band 86 to the frame 84. The hydraulic actuator 82 contains hydraulic fluid which can be pumped to the piston-and-cylinders upon command. A solenoid 88 is connected to the actuator 82. The solenoid 88 has a first line 90 which is connected to the battery of the pickup truck 14. The solenoid 88 also includes a second line 92 that extends to the controller 74. The battery supplies power, through line 90, to the solenoid 88. The controller 74 will supply a control signal through line 92 to the solenoid 88. Upon proper command, the hydraulic actuator 82 will pump hydraulic fluid through hydraulic line 94 to the piston-and-cylinders. The introduction of hydraulic fluid into hydraulic line 94 will cause the piston-and-cylinder to expand for the purpose of moving the storage device 10 into its second, or uppermost, position. Since the hydraulic actuator 82, and its associated components, are positioned on the underside of bed 12, the hydraulic actuator 82 will not be readily apparent to passersby. As such, the positioning of the hydraulic actuator 82 further adds to the inconspicuous nature of the storage device 10 of the present invention.

It is important to note that it is possible that the present invention could also use pneumatics, instead of hydraulics. If pneumatics are used, then the hydraulic actuator 82 can be replaced by a pneumatic actuator, of similar configuration.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A storage device for a bed of a pickup truck, the bed having a side wall with a wheel well formed therein, the storage device comprising:
   a body having a storage area therein, said body having a door affixed thereto, said door for allowing access to said storage area; and
   a fluid-activated lift means attached to said body at opposite ends of said body, said lift means for moving said body between a first position in juxtaposition to the bed of the truck and a second position above the side wall of the truck, said door positioned above the side wall in the second position.

2. The storage device of claim 1, said body having an indentation formed therein, said indentation having an area greater than the wheel well of the truck.

3. The storage device of claim 2, said body having generally flat bottom surfaces extending downwardly from said indentation, said bottom surfaces for surface-to-surface contact with the bed in said first position.

4. The storage device of claim 1, said body positioned adjacent the side wall of the pickup truck, said door interposed between said body and said side wall in said first position.

5. The storage device of claim 4, said door hingedly connected to a top surface of said body, said door extending downwardly from the hinged connection.

6. The storage device of claim 1, said body having rollers interposed between said body and the side wall.

7. The storage device of claim 1, said lift means comprising:
   a first hydraulic piston-and-cylinder affixed to a first end of said body and to the bed of the truck;
   a second hydraulic piston-and-cylinder affixed to a second end of said body and to the bed of the truck; and
   an actuator means hydraulically connected to said first and second piston-and-cylinders, said actuator means for moving said body between said first and second positions.

8. The storage device of claim 7, said actuator means affixed to a frame of the truck below the bed of the truck, said actuator means having at least one hose extending to said first and second piston-and-cylinders.

9. The storage device of claim 7, further comprising:
   a remote controller electrically connected to said actuator means, said remote controller for causing desired movement of said body between said first and second positions.

10. The storage device of claim 9, said remote controller having an electrical line of greater than six feet long, said remote controller demountably received within a cab of the truck, said remote controller removable so as to be moved exterior of the truck.

11. The storage device of claim 1, further comprising:
    a channel member affixed in the bed adjacent a side of the body opposite the side wall, said channel member extending upwardly from the bed so as to form a receiving area for said body in said first position.

12. The storage device of claim 7, said first end of said body having an inset slot, said first piston-and-cylinder received within said inset slot of said first end, said second end of said body having another inset slot, said second piston-and-cylinder received within said inset slot of said second end.

13. A storage device for a bed of a pickup truck comprising:
    a body having a storage area therein, said body having an indentation formed along a bottom surface of said body, said indentation having a shape for fitting over a wheel well of the pickup truck; and
    lift means connected to said body, said lift means for moving said body between a first position juxtaposed to the bed and a second position above said bed.

14. The storage device of claim 13, said body having a door hingedly connected to a top surface of said body, said door extending downwardly from said top surface, said door for allowing access to said storage area.

15. The storage device of claim 13, said lift means comprising:
    a first hydraulic piston-and-cylinder affixed to a first end of said body;
    a second hydraulic piston-and-cylinder affixed to an opposite end of said body; and
    an actuator means hingedly connected to said first and second piston-and-cylinders, said actuator means for moving said body between said first and second positions.

16. The storage device of claim 15, said actuator means affixed to a frame of the truck below the bed of the truck, said actuator means having at least one hose extending to said first and second piston-and-cylinders, a remote controller is electrically connected to said actuator means for causing desired movement of said body between said first and second positions.

17. The storage device of claim 13, said body having a plurality of rollers attached to a vertical surface of the body.

18. A storage device for a bed of a pickup truck, the pickup truck having a side wall extending upwardly from the bed, the storage device comprising:
    a body having a storage area therein, said body having a door affixed thereto, said door for allowing access to said storage area, said body juxtaposed the side wall of the pickup truck; and
    a lift means attached to said body for moving said body between a first position below a top of the side wall and a second position above the side wall, said door interposed between the side wall and said body in said first position, said door in an openable position above the side wall in the second position.

19. The storage device of claim 18, further comprising:
    a channel member affixed to the bed adjacent a side of said body opposite the side wall, said channel member extending upwardly from the bed, said channel member extending longitudinally along the bed of the truck.

20. The storage device of claim 18, said body having a flat bottom surface juxtaposed against said bed in said first position, said flat bottom surface having an indentation formed therein, said indentation having an area for extending over a wheel well of the pickup truck.

* * * * *